US009679557B2

United States Patent
Weilhammer et al.

(10) Patent No.: US 9,679,557 B2
(45) Date of Patent: Jun. 13, 2017

(54) COMPUTER-IMPLEMENTED METHOD FOR AUTOMATIC TRAINING OF A DIALOGUE SYSTEM, AND DIALOGUE SYSTEM FOR GENERATING SEMANTIC ANNOTATIONS

(71) Applicant: ELEKTROBIT AUTOMOTIVE GmbH, Erlangen (DE)

(72) Inventors: Karl Weilhammer, Nuremberg (DE); Silke Goronzy-Thomae, Erlangen (DE)

(73) Assignee: ELEKTROBIT AUTOMOTIVE GmbH, Erlangen (DE)

( * ) Notice: Subject to any disclaimer, the term of this patent is extended or adjusted under 35 U.S.C. 154(b) by 30 days.

(21) Appl. No.: 14/260,824

(22) Filed: Apr. 24, 2014

(65) Prior Publication Data
US 2014/0324429 A1   Oct. 30, 2014

(30) Foreign Application Priority Data
Apr. 25, 2013  (DE) ........................ 10 2013 007 502

(51) Int. Cl.
G10L 15/06 (2013.01)
G10L 15/18 (2013.01)

(52) U.S. Cl.
CPC ........ *G10L 15/063* (2013.01); *G10L 15/1815* (2013.01); *G10L 15/1822* (2013.01)

(58) Field of Classification Search
CPC .................................................. G10L 15/063
See application file for complete search history.

(56) References Cited

U.S. PATENT DOCUMENTS 6,879,953 B1 * 4/2005 Oishi ...................... G10L 15/22
704/205
2003/0012347 A1   1/2003 Steinbiss et al.
(Continued)

FOREIGN PATENT DOCUMENTS

| DE | 10122828 A1 | 11/2002 |
| DE | 102008051757 A1 | 5/2009 |
| WO | 2011/059781 A1 | 5/2011 |

OTHER PUBLICATIONS

Gemmeke, J.F. et al., "A Self-Learning Assistive Vocal Interface Based on Vocabulary Learning and Grammar Induction", Adaptation and Learning for Assistive Domestic Vocal Interfaces, pp. 1-4; Cited in DE Office Action dated Nov. 19, 2013 (4 pages).
(Continued)

*Primary Examiner* — Ibrahim Siddo
(74) *Attorney, Agent, or Firm* — Westerman, Hattori, Daniels & Adrian, LLP (57) ABSTRACT

An adaptive dialogue system and also a computer-implemented method for semantic training of a dialogue system are disclosed. In this connection, semantic annotations are generated automatically on the basis of received speech inputs, the semantic annotations being intended for controlling instruments or for communication with a user. For this purpose, at least one speech input is received in the course of an interaction with a user. A sense content of the speech input is registered and appraised, by the speech input being classified on the basis of a trainable semantic model, in order to make a semantic annotation available for the speech input. Further user information connected with the speech input is taken into account if the registered sense content is appraised erroneously, incompletely and/or as untrustworthy. The sense content of the speech input is learned automatically on the basis of the additional user information.

15 Claims, 5 Drawing Sheets

(56) References Cited

U.S. PATENT DOCUMENTS

| | | | |
|---|---|---|---|
| 2007/0055529 A1 | 3/2007 | Kanevsky et al. | |
| 2007/0106497 A1 | 5/2007 | Ramsey et al. | |
| 2008/0312934 A1 | 12/2008 | Cerra et al. | |
| 2010/0185445 A1 | 7/2010 | Comerford et al. | |
| 2010/0296638 A1* | 11/2010 | Wang | H04M 3/4217 379/88.04 |
| 2010/0312547 A1* | 12/2010 | Van Os | G06F 3/167 704/9 |
| 2011/0022393 A1 | 1/2011 | Waller et al. | |
| 2011/0288867 A1* | 11/2011 | Chengalvarayan | G10L 15/063 704/251 |
| 2011/0301955 A1 | 12/2011 | Byrne et al. | |
| 2012/0296638 A1* | 11/2012 | Patwa | G06F 17/30654 704/9 |
| 2014/0278435 A1* | 9/2014 | Ganong, III | G10L 15/22 704/275 |

OTHER PUBLICATIONS

Office Action dated Nov. 19, 2013, issued in German Patenet Application No. 10 2013 007 502.5 English Translation only (5 pages).

* cited by examiner

COMPUTER-IMPLEMENTED METHOD FOR AUTOMATIC TRAINING OF A DIALOGUE SYSTEM, AND DIALOGUE SYSTEM FOR GENERATING SEMANTIC ANNOTATIONS

TECHNICAL FIELD

The present disclosure relates generally to the use of a semantic system for supporting user terminals. In concrete terms, a method for automatic training of a dialogue system and a corresponding dialogue system are specified, in order to generate semantic annotations automatically on the basis of user information.

BACKGROUND

In many technical fields a text control or voice-supported control is already being employed today. A text control enables a user to input commands into a system by means of predetermined text modules (such as a word or word sequence). This field also covers search queries, writing and sending of text messages etc., which are undertaken by text input and mostly by a following confirmation.

A voice-supported control enables a user to input control commands or other information—such as, for example, settings, parameters etc.—by means of spoken words or, to be more exact, language. This facilitates the input, to the effect that the user does not have to operate any conventional input means such as, for example, keyboard, function keys, selection tools etc.

Technical fields in which such speech inputs already find application are, inter alia, mobile telephones, vehicle control devices and also navigation instruments. The user can, for example, input contacts from an address book, controls of certain vehicle elements or destination addresses by targeted voice commands. The vehicle control system encompasses, inter alia, the switching on/off, adapting or adjusting of vehicle elements such as, for example, windscreen wipers, temperature (heating and air-conditioning system), interior lighting, seats, etc.

In US Patent Application No. 2008/0312934 A1 a speech-recognition system is described which comes into operation for certain applications. These applications encompass a navigation application, messaging application, music application, search application for (stored) contents and local search application. In the case of use with a navigation application, a navigation-related content may have been stored in a database and may be used by a speech-recognition device. For example, a speech-recognition device may use the navigation-related content in order to influence a speech-recognition model. In this connection various speech models may come into operation, which have been adapted to a corresponding application.

According to the disclosure of US 2008/0312934 A1, various applications may have recourse to or may use a speech-recognition device, in order to simplify inputs for the corresponding application for the user. In addition, the use of various speech models permits the speech recognition to be employed for certain expressions, words or commands, specifically for the defined application. However, this has the disadvantage that a further adaptation of the speech models has to take place individually. For example, a certain term would have to be trained for each speech model.

SUMMARY

The object underlying the present disclosure is to improve the automatic training of a dialogue system and to make available an appropriate method and dialogue system.

According to one aspect of the present disclosure, a computer-implemented method is disclosed for automatic training of a dialogue system. The method serves for automatic generating of semantic annotations on the basis of a received speech input, the semantic annotations being intended for controlling instruments or for communication with a user. The method includes receiving at least one speech input in the course of an interaction with a user, and registering and appraising a sense content of the speech input, by the speech input being classified on the basis of a trainable semantic model, in order to make a semantic annotation available automatically for the speech input. The method further includes a taking into account of further user information connected with the reception of the speech input if the registered sense content is appraised erroneously, incompletely and/or as untrustworthy, and an automatic learning of the sense content of the speech input on the basis of the additional user information.

User information is, inter alia, context information—such as, for example, further inputs of the user in the context of the speech input—and/or general information about the user, and/or information about the manner in which the user is interacting with the dialogue system.

The user interacts with a dialogue system via language. A speech input of a user may include one or more spoken, written and/or typed utterances, as well as facial expressions, gestures and/or gesticulations. A speech input as defined in the present disclosure may thus comprise at least one of one or more spoken inputs, written inputs, typed inputs, facial expression inputs, gesture inputs and gesticulation inputs. Systems in which the method can be employed are search engines, chatbots, games consoles, web-mining applications or other interactive services.

According to many specific distinct forms, this method offers the advantage of being able to register the sense content of a speech input on the basis of a trainable semantic model, and to allocate a range of meanings to the speech input. In particular, by virtue of the taking into account of user information that is connected with the reception of the speech input it is also possible for new meanings or a new sense content for a speech input to be registered.

According to one implementation, the semantic model is trained on the basis of at least one of the received speech input, the learned sense content of the speech input, and a corresponding transcription into a semantic annotation.

According to a variant, the learning on the basis of the user information occurs only when a connection can be established between the reception of the speech input and the user information. This connection between the reception of the speech input and the user information can be determined on the basis of a temporal and/or semantic correlation.

According to a further implementation, the learning step may include at least one of establishing the sense content of the user information, comparing the received speech input with the sense content of the user information, and successively deriving or completing the sense content of the received speech input on the basis of a known sense content of the user information.

The taking of further user information into account and the learning can be continued until such time as the sense content of the received speech input becomes complete and/or is recognised as trustworthy or is terminated by a user-abort action.

Alternatively or in addition to this, the trustworthiness of the sense content of the speech input can be assessed on the basis of confidence values allocated in the course of the classification of the speech input.

Likewise alternatively or in addition to this, the learning may include at least completing an incompletely classified received speech input, correcting a misinterpreted part of the received speech input, and/or reclassifying an incorrectly classified or non-classified speech input.

According to a further implementation, the taking of the user information into account may include deriving the user information from at least one user input that immediately follows the reception of the speech input. In this case the at least one user input may include at least one correcting control input which corrects a preceding control command made available on the basis of the speech input.

In a further implementation, the taking of the user information into account may include at least making a restricted choice of input options available, and/or receiving one or more user inputs on the basis of the input options made available. In this case the user inputs may generally be based on acoustic or haptic actions of the user. Alternatively or additionally, they also include facial expressions, gestures and/or gesticulations that are made by the user.

In a further implementation, the speech input and the context information are processed as a symbolic representation. In a pre-processing step a symbolic representation is generated, for example by means of speech recognition, facial-expression recognition, gesture recognition and/or gesticulation recognition.

In a further aspect, a computer-program product is disclosed with program code for carrying out one of the methods presented above when the computer-program product is executed on a computer device. The computer-program product may have been stored on a computer-readable recording medium.

According to a further aspect, an adaptive dialogue system is disclosed for use in terminals. The dialogue system is designed to generate semantic annotations automatically on the basis of a received speech input, the semantic annotations being intended for controlling the terminals or for communication with a user. In this connection the dialogue system includes an input interface which is designed to receive at least one speech input in the course of an interaction with a user. In addition, the dialogue system includes a semantic classifying device that is designed to register and classify the sense content of the speech input on the basis of a trainable semantic model, to make a semantic annotation available automatically for the speech input on the basis of the classification, to take into account further user information connected with the reception of the speech input if the registered sense content is appraised erroneously, incompletely and/or as untrustworthy, and to learn the sense content of the speech input on the basis of the additional user information.

The input interface may be designed as an interface for a speech-recognition device. Alternatively or in addition to this, the input interface may be designed as an interface for a text input, for example by means of keyboard, keypad and/or function keys. This interface for a text input permits the receiving of a word or word sequence—that is to say, a speech input in the sense defined above. Furthermore, the interface may be capable of relaying the received word sequence.

According to one implementation, the dialogue system includes a training device that is provided to train the semantic model on the basis of at least one of the learned sense content of a speech input, the speech input, and a transcription into a semantic annotation. For this purpose the speech input may be present in the form of a symbolic representation.

Alternatively or in addition to this, the dialogue system includes a storage device that is provided to store, entirely or partly, at least one of the received speech input, the learned sense content of the received speech input and a transcription into a semantic annotation.

Likewise alternatively or in addition to this, the dialogue system includes a dialogue manager that is provided to make an input prompt available to a user in order to obtain an additional item of information if a classification result has been appraised erroneously, incompletely or as untrustworthy.

According to one implementation, the semantic model is designed in the form of a neural network, a Bayes classifier, a support-vector machine, a parser or a decision tree.

According to a further implementation, the dialogue system includes a communications device that is provided to send to a server or to retrieve from a server the received speech input together with the learned sense content of the speech input and/or with the transcription. Alternatively or in addition to this, the dialogue system is part of a human/machine interface.

According to a further aspect, a control device is disclosed that includes the above dialogue system. The control device may be a device that has been set up for controlling vehicle components. Numbered amongst these components are windscreen-wiper control, window-lifters, temperature and climate control, seat control, mirror control, interior-lighting control etc. Furthermore, the control device may pertain to a navigation instrument (e.g. for a vehicle).

BRIEF DESCRIPTION OF THE DRAWINGS

Further aspects, advantages and particulars of the present disclosure will become apparent from the following description of the embodiments in conjunction with the Figures, wherein.

DETAILED DESCRIPTION

The present disclosure will be elucidated with the aid of schematic block diagrams and flow charts. The technical teaching underlying these diagrams may be implemented both in hardware and in software or in a combination of hardware and software. Numbered amongst such implementations are also digital signal processors (DSPs), application-specific integrated circuits (ASICs) and other switching or computing components.

Figure 1:
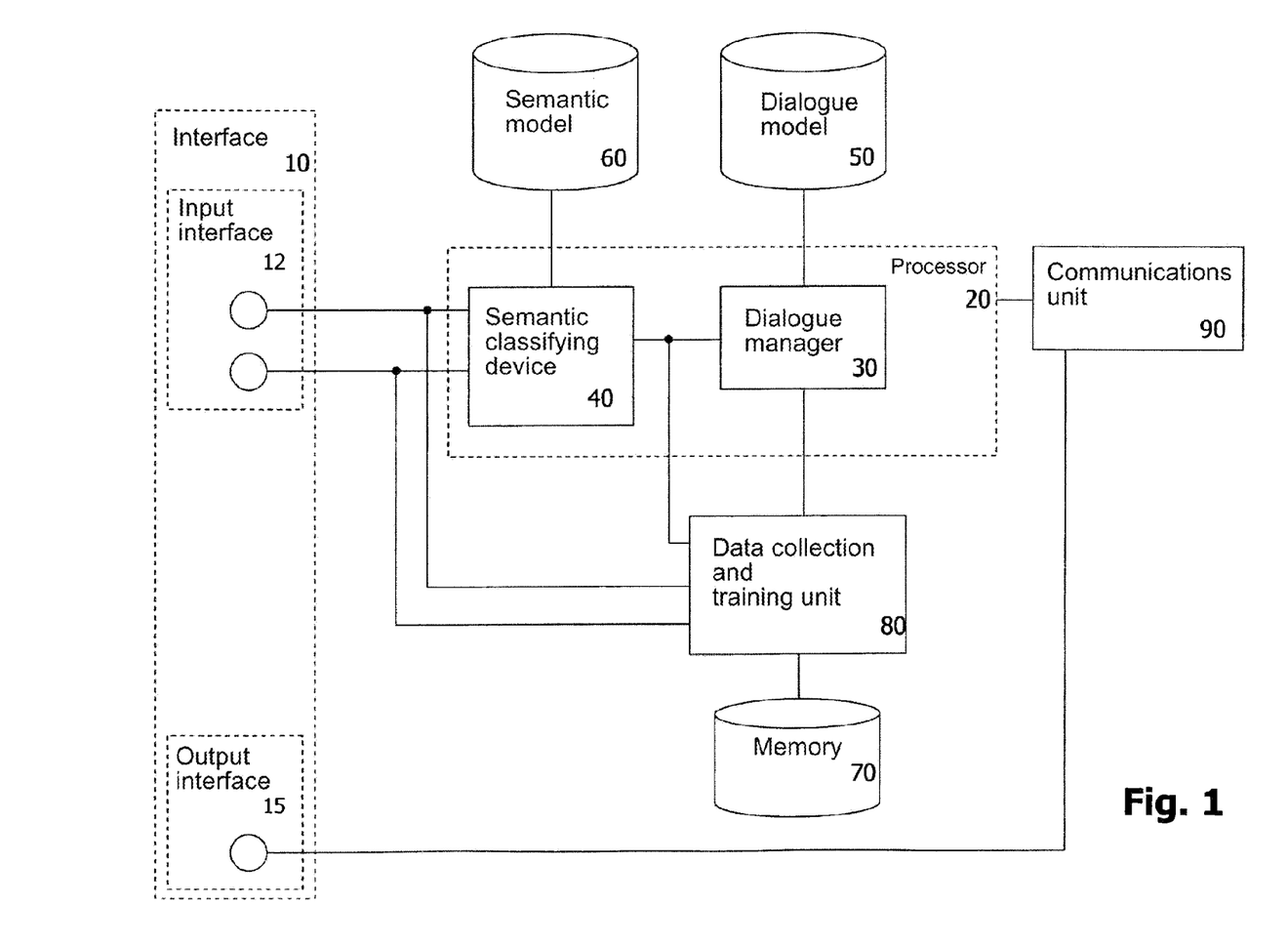
FIG. 1 shows a block diagram of an embodiment of a dialogue system.

FIG. 1 shows a dialogue system that finds application in a motor vehicle or terminal (e.g. portable navigation instrument). The dialogue system has been designed to generate semantic annotations automatically on the basis of received speech inputs, the semantic annotations being intended for controlling the terminals or for communication with a user.

The user interacts with the dialogue system via language. A speech input of a user may include one or more spoken, written and/or typed utterances, as well as facial expressions, gestures and/or gesticulations.

It is self-evident that the present disclosure is not restricted to the reception or input of a speech input in the sense of a word sequence—that is to say, a plurality of words. The input of an individual word, a syllable or even only one sound is just as possible as the input of whole sentences. Therefore the meaning of the term 'speech input' in the entire disclosure may also be extended to an individual word, a syllable or a sound.

The dialogue system includes an interface 10. Here it may be a question of a universal interface such as a serial or parallel interface, for example. The interface 10 may also consist of a group of special, proprietary interfaces. For example, it may include an input interface 12 and an output interface 15.

The interface 10 and also the input interface 12 and output interface 15 may be realised as a hardware interface, software interface or a combination of hardware and software. It may be a question of wireless or cable-bound interfaces.

The input interface 12 serves primarily for receiving speech inputs. For this purpose the input interface 12 has been set up to receive data, in particular data that represent speech inputs. As has been shown in more detail in FIG. 2, the interface 10 may include one or more input interfaces 12. A first input interface may, for example, have been connected to a recognition unit 210. The latter generates a symbolic representation, for example word numbers or word sequences, from a speech input, and transmits or relays said representation to the dialogue system via the input interface 12.

Figure 2:
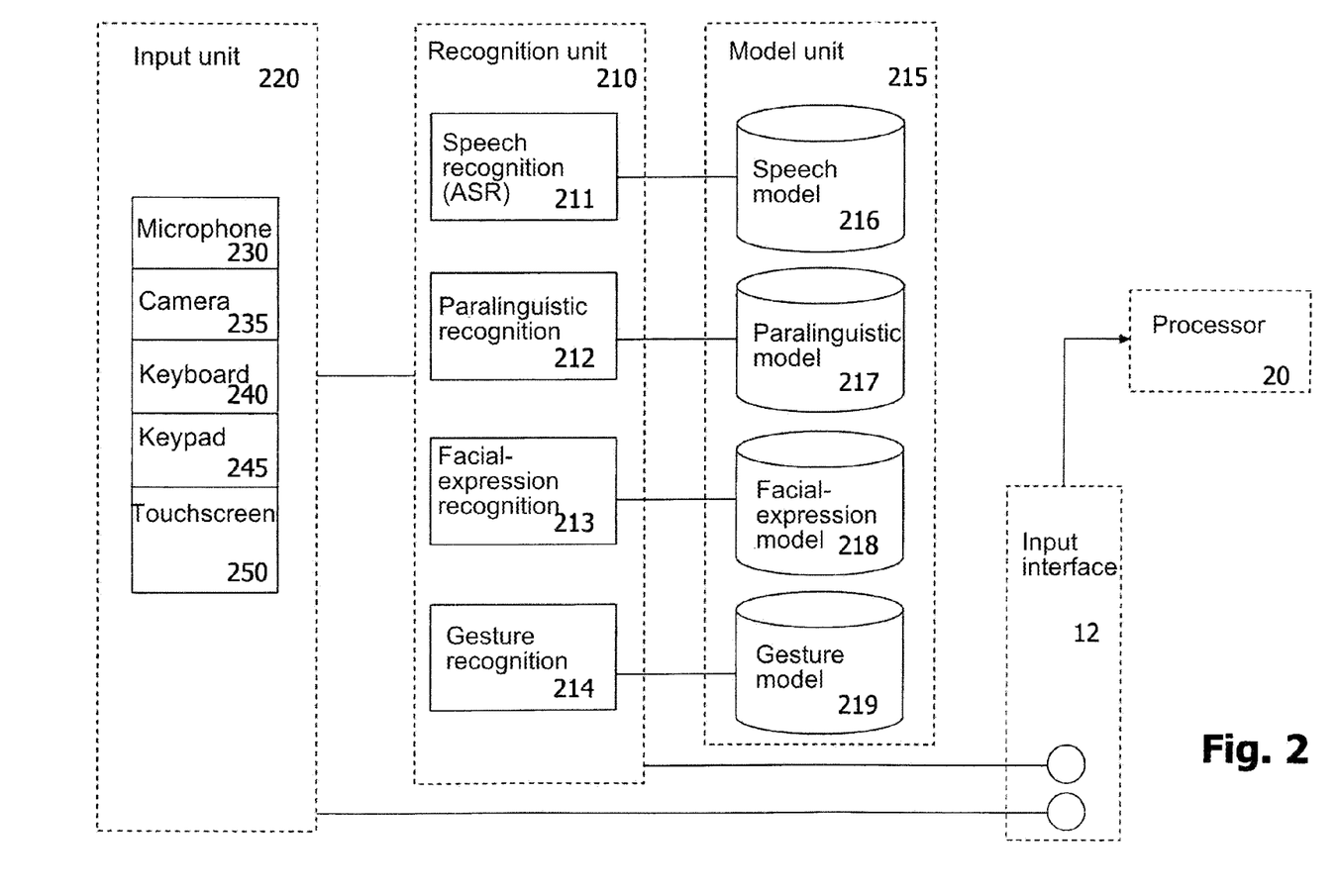
FIG. 2 shows a block diagram of an embodiment of an input unit and of a speech-recognition device.

The recognition unit 210 includes various recognition devices. Numbered amongst these are a speech-recognition device 211, a paralinguistic-recognition device 212, a facial-expression-recognition device 213 and/or a gesture-recognition device 214. For the recognition unit 210 or, to be more exact, the detection devices 211-214 included therein there is a model unit 215. The model unit 215 includes various models which the recognition devices 211-214 can access. Numbered amongst these are a speech model 216, a paralinguistic model 217, a facial-expression model 218 and/or a gesture model 219.

The speech-recognition device 211 may, for example, receive speech signals from a microphone 230. The received signals are subsequently converted by means of one or more speech models 215 into text or another symbolic representation—that is to say, the speech signals are translated into one or more spoken subunits such as words, syllables, letters, characters or numbers, and converted into digital text. In this connection, with the aid of one or more speech models 215 the probability is ascertained that a certain received speech signal represents a subunit. In this connection the probability of a certain succession of received speech signals corresponding to a certain succession of words (a word sequence) is also taken into account by the speech models 215. Accordingly, the probabilities that certain words are spoken in a certain sequence are taken into account.

Speech recognition by means of speech models is known and will therefore not be described in any further detail. The speech-recognition unit 210 outputs at least one symbolic representation of a word or of several words—that is to say, a word sequence—in the form of digital data. For example, the speech-recognition unit 210 can output an ASCII code for the characters of the recognised word sequence. It is self-evident that other standards or codes can be used for outputting the recognised text, such as UTF-8, Unicode or word numbers, for example.

The paralinguistic recognition, the facial-expression recognition and gesture recognition by the paralinguistic-recognition device 212, the facial-expression-recognition device 213 and the gesture-recognition device 214, respectively, function in similar manner. With the paralinguistic-recognition device 212, for example, laughing is recognised from a speech signal and converted into a symbolic representation by means of the paralinguistic model 217.

For the facial-expression recognition and gesture recognition, a video signal of a camera 235 is evaluated and converted into a symbolic representation. The gesture recognition may also register gesticulations and convert them into a symbolic representation. Processes for this are also already known.

The symbolic representations that are generated in the speech-recognition, paralinguistic-recognition, facial-expression-recognition or gesture-recognition devices 211-214 may include time-stamps.

The digital speech data that are output are transmitted to the input interface 12 of the dialogue system, in order to be processed further therein. The input interface 12 either may exhibit a special input interface for the communication of the digital speech data or may be a universal interface for digital speech data and further data and/or signals.

In FIG. 2 an implementation has been shown that exhibits two separate input interfaces. In this case a second interface serves for connecting an input unit 220. The input unit may include at least one of the microphone 230, the camera 235, a keyboard 240, a keypad 245 and a touchscreen 250. Each of these components 230 to 250 serves for the interaction of a user for the purpose of inputting speech signals, text inputs, text commands, user information, parameters or other data by a user. In the case of the touchscreen 250, the input unit is part of an output unit, since a touchscreen constitutes both input unit and output unit for a user.

The signals that are output by the above-described components 230 to 250 of the input unit 220 are sufficiently well-known and will therefore not be described any further. The output signals of the input unit 220 are likewise transmitted to the input interface 12, in order to be processed further by the dialogue system.

Again with reference to FIG. 1, the dialogue system includes a processor 20. The latter may have been implemented as an integrated circuit or other data-processing component. But the processor 20 may also consist of several circuits, components, devices etc.

As an example, FIG. 1 shows a dialogue manager 30 and also a semantic classifying device 40, which may have been implemented as individual components. Alternatively, the dialogue manager 30 and the classifying device 40 may have been implemented as software which is executed by the processor 20.

Both the dialogue manager 30 and the classifying device 40 are able to process the data and/or signals transmitted to the input interface 12. For this purpose the input interface 12 has been connected to the processor 20 or, to be more exact, dialogue manager 30 and to the classifying device 40, for example by means of a bus.

The mode of operation of the processor 20, of the dialogue manager 30 and of the classifying device 40 will be described with reference to an example in which the dialogue system has been integrated into a vehicle (e.g. for the purpose of controlling an automatic climate-control system or an on-board navigation instrument). A user inputs the voice command "put up the temperature" or "drive to Nuremberg". In this connection, via the microphone 230 the speech of the user is converted into speech signals which are transmitted to the speech-recognition device 211. With the aid of the speech model (or speech models) 216 the speech signals are recognised and converted into text which is transmitted as speech data to the input interface 10. The dialogue system consequently receives the text or, to be more exact, the word sequence "put up the temperature" or "drive to Nuremberg". The classifying device 40 receives the word sequence and registers the sense content with the aid of a semantic model 60.

In another example, the processor of the present disclosure is employed in a search engine, in a chatbot, in a web-mining application or in another interactive service. These systems and services enable a text input by a user. This text input is, as described above, relayed as a word or word sequence to the processor via the input interface 12. The classifying device 40 likewise receives the word sequence again and registers the sense content with the aid of a semantic model 60.

The semantic model 60 may be realised by a neural network or by a decision tree. Alternatively, the semantic model 60 may also have been put into effect in the form of a Bayes classifier, a support-vector machine or a parser. According to one implementation, the semantic model 60 is a data structure that stores key/value pairs and associated probabilities. These key/value pairs may be meaning/word pairs, to which a certain probability has been assigned in each instance. Furthermore, the data structure in the semantic model 60 may also store the probabilities of meaning/word-sequence pairs. In other words, the semantic model 60 stores a meaning together with a word or word sequence and a probability for this meaning/word(-sequence) combination. Several such combinations may also have been stored for various meanings of a word or word sequence with corresponding probability. Of course, conversely the storage of several combinations of one meaning and of various words or word sequences is also possible.

The semantic model 60 is obtained from a data collection containing words, word sequences or sentences, to which the semantic meanings have been assigned, such as, for example, for a navigation instrument:

ZoomIn: "please enlarge the map"
ZoomIn: "higher resolution please"
ZoomOut: "Please make the map smaller"
ZoomOut: "lower resolution"

The model then contains lists of weights and/or probabilities that have been assigned to a meaning and to one or more words:

0.5; ZoomIn: map
0.5; ZoomOut; map
1; ZoomIn; enlarge
1; ZoomOut: reduce
1; ZoomIn; higher resolution
1; ZoomOut: lower resolution In addition, the probabilities P(meaning|word) for each word and each meaning can be calculated. The semantic model 60 is consequently a data structure that contains these probabilities. Now if there is a word sequence or word chain (W1, W2, W3) and if it is to be found whether this has the meaning B1 or B2, then, on the assumption of statistical independence, the probabilities $$P(B1|W1,W2,W3)=P(B1|W1)P(B1|W2)P(B1|W3) \text{ and}$$

$$P(B2|W1,W2,W3)=P(B2|W1)P(B2|W2)P(B2|W3)$$

can be computed approximately. If in this process it turns out that $$P(B1|W1,W2,W3)>P(B2|W1,W2,W3)$$

holds, then the word chain is annotated with B1; otherwise with B2. This process can, of course, also be applied in the case of more than two meanings. The more word sequences are available for estimating the probabilities, and the more precisely they correspond to what the user wishes to say, the better the classifying device 40 becomes.

In another example, the meaning "temperature control" or "menu for temperature control" might have been allocated to the word "temperature". The semantic model 60 would accordingly store a certain probability for the meaning/word-pair (temperature-setting+"temperature"). A different probability which has been stored in the semantic model 60 can be assigned to the words "put up". There is possibly already a probability for a certain meaning of the word sequence "put up temperature".

The classifying device 40 can consequently compute, on the basis of the stored probabilities, how high is the probability that the user would like to call up the temperature setting, would like to put up the temperature in the passenger compartment of the vehicle, or similar. If the computed probability exceeds a certain threshold value, the corresponding component of the vehicle is controlled. If several computed probabilities exceed the threshold value, then (as clarified above) the meaning having the greatest probability is used. In the present example, for the meaning to set the temperature one degree higher the highest probability might have been computed. After this, the dialogue system would instruct the temperature control of the vehicle to put up the temperature by 1 degree.

The semantic model 60 and the classifying device 40 are consequently capable of ascertaining the semantics—that is to say, the sense content, the meaning or the grouping—of a received word or word sequence. The classifying device 40 is accordingly capable of making a semantic annotation available automatically to each word or to the entire speech input on the basis of the classification. The semantic annotation can subsequently be used further by a further component, such as the dialogue manager 30, for example.

The dialogue manager 30 receives the semantic annotation from the classifying device 40, in order to carry out further steps. Optionally, the dialogue manager 30 may also receive the word sequence together with the semantic annotation. With the word sequence the dialogue manager might initiate a dialogue with the user. It is self-evident that the dialogue manager 30 can also receive the word sequence (or an individual word) directly from the input interface 12, and merely the associated annotation(s) from the classifying device 40.

With the aid of one or more dialogue models 50 the dialogue manager 30 is capable of making an input prompt available to a user in order to obtain additional user information if a classification result has been appraised by the classifying device 40 erroneously, incompletely or as untrustworthy. In the case of the user information it is a question of any information that is communicated or input to the system by the user of the system. If in the above example the words "put up" had not been classified or had been classified only with insufficient probability, the dialogue manager 30 is capable of retrieving a further input by the user. For this purpose the dialogue manager 30 makes use of one or more output units which have been connected to the output interface 15.

Figure 3:
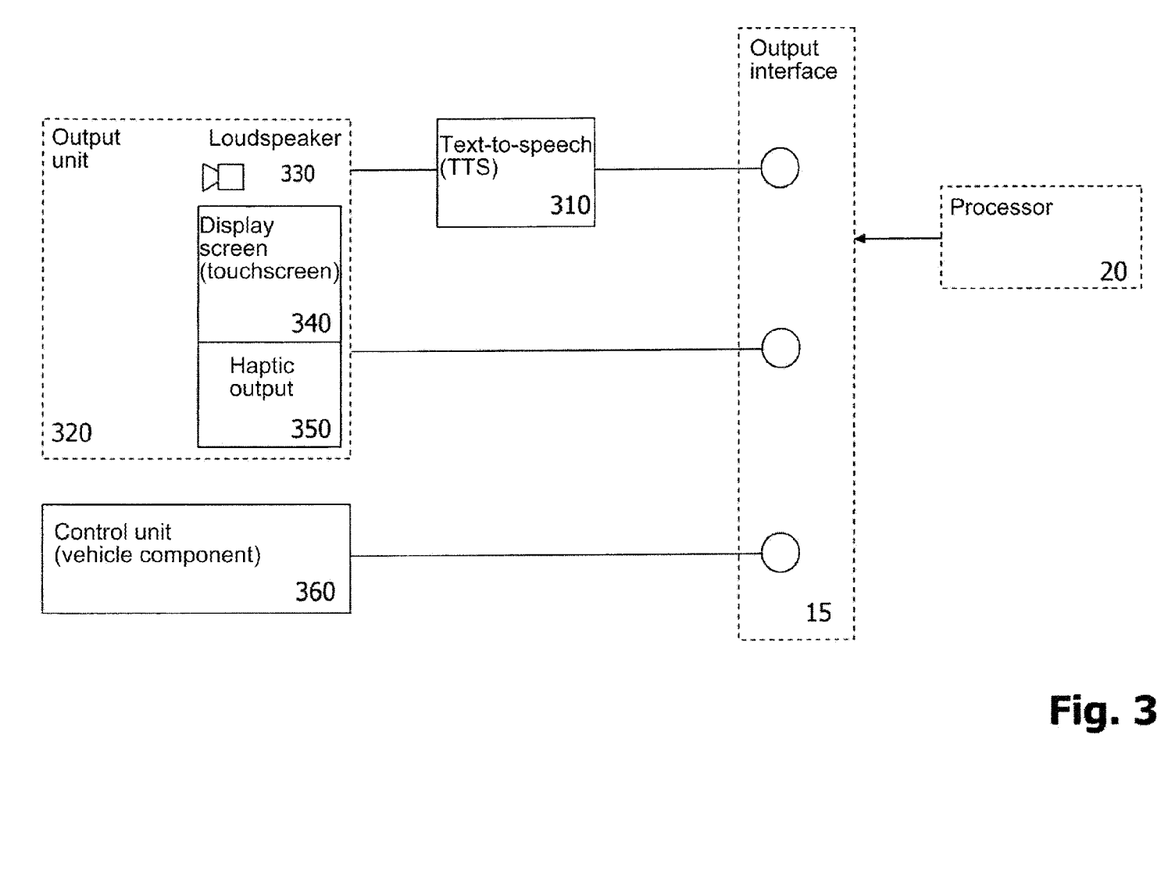
FIG. 3 shows a block diagram of an embodiment of an output unit as well as output components of a dialogue system.

As has been represented in more detail in FIG. 3, in the case of the output unit 320 it may be a question of a loudspeaker 330, a display screen 340 or a haptic output unit 350. Via the output interface 15 these output units have been coupled with the dialogue system. By virtue of the output interface 15 it is possible for the processor 20, the dialogue manager 30 and/or the classifying device 40 to access the output unit 320 or to utilise the latter.

Furthermore, a text-to-speech unit 310 (TTS) has been provided which converts one or more text commands into speech, in order to output them to the user by means of the loudspeaker 330. Again with reference to the above example ("put up" was not recognised or was recognised only insufficiently), using one or more dialogue models 50 the dialogue manager 30 generates the question: "Is the temperature to be raised by 1 degree?". This text is converted into audio signals via the text-to-speech unit 310 and relayed to the output unit 320, in particular to the loudspeaker 330.

Alternatively or in addition to this, the text generated by the dialogue manager 30 may also be transmitted to the display screen 340, in order to be displayed there as text. Optionally, the haptic output unit 350 may also be driven, in order to generate a haptic signal such as, for example, a vibration in the steering wheel. By virtue of this haptic output the user has his/her attention drawn to the fact that, for example, a question from the dialogue system is being displayed on the display screen. This output is particularly advantageous if no loudspeaker 330 is present or if, by reason of high ambient noises detected, an acoustic output of the question would not be understood by the user. This prevents further errors that would be generated by virtue of a misunderstanding with the user.

Again with reference to FIG. 1, in interplay with the dialogue model 50 the dialogue manager 30 generates a dialogue with the user. In this process the dialogue model 50 (or the dialogue models 50) has been set up in such a way that the user can give simple replies such as, for example, "yes"/"no" or "1 degree", "½ degree", "on"/"off" etc.

The user would reply to this enquiring by the dialogue system by means of a further input. For example, the user can answer with "yes" or with "1 degree warmer". In this connection the present disclosure permits any input by the user, both acoustic, by facial expressions, gestures or gesticulations, and also by means of further input devices 240-250 (see FIG. 2).

Alternatively to this, the dialogue system can also control a vehicle component directly. This is possible if the probability of the meaning has exceeded a certain threshold value. Consequently the dialogue system can avoid a long dialogue with the user, in which commands of the user are misunderstood time and time again. As has likewise been shown in FIG. 3, in this connection the dialogue system makes use of the output interface 15, to which a control unit or vehicle component 360 of the vehicle has been connected. In the above example the dialogue system might raise the temperature by 1 degree and indicate this to the user. This indicating may again occur acoustically, haptically, on a display screen or with a combination thereof. If it was the wrong setting, the user can alter this himself/herself. By means of this correction, once again the dialogue system can be trained appropriately.

In the case of a further voice command or text input on the display screen a further input would be transmitted to the dialogue system via the input interface 12, and the procedure of semantic classification and semantic annotation of the received inputs would begin once again. This iteration is continued until such time as the dialogue system has recognised the input of the user with sufficient probability.

In a further particularly advantageous embodiment of the present disclosure the dialogue system includes a storage device 70 and also a training unit 80. The storage unit 70 has been provided to store, entirely or partly, the received speech/text input, the recognised word sequence, the learned sense content of the received word sequence and/or a transcription into a semantic annotation.

This will now be elucidated with reference to a further example using the dialogue system. If the dialogue system has been implemented in a vehicle, a user can communicate the instruction "I am cold" to the dialogue system by means of speech input or text input. In the case of a speech input, this is firstly recognised by the speech-recognition device 211 (FIG. 2). In each case the word sequence "I am cold" is communicated to the dialogue system via the input interface 12.

An untrained dialogue system, but also a dialogue system that has already been preset, will be unable to allocate an unambiguous meaning to this instruction. The classifying device 40 will at least allocate to the word "cold" the sense or meaning "temperature". Therefore it is necessary to obtain further information from the user.

As already described above, the classifying device 40 will instruct the dialogue manager 30 to begin a dialogue with the user with respect to the temperature. Since in the utterance of the user the word "cold" was recognised and a sense content was able to be classified, the dialogue manager 30 or processor 20 will incorporate the temperature setting of the vehicle into the dialogue. Optionally, the dialogue system can call up the temperature setting or can immediately set the temperature lower—that is to say, colder. As has likewise been shown in FIG. 3, in this case the dialogue system makes use of the output interface 15, to which a control unit or vehicle component 360 of the vehicle has been connected. Furthermore, it is possible that the dialogue system communicates a haptic output to the haptic output unit 350, so that the user detects that the temperature display was called up or the temperature was lowered. Similarly, a verbal output of the temperature setting carried out is possible.

In each case the user might react to this course of action of the dialogue system. In the process the user communicates further or additional user information to the system. This item of user information is once again a speech input, text input, function selection of a component (e.g. of a temperature controller or of another controller connected with the speech input) or similar. For example, the user might say "please raise the temperature". As an alternative to this, the user might, as mentioned, also carry out the temperature setting himself/herself and raise the temperature or, to be more exact, set it to be warmer.

In both cases a signal or data that represent the user reaction is/are transmitted to the dialogue system from the input unit 220 and/or from the recognition unit 210 (see FIG. 2). In both cases the dialogue system will establish that a lower setting of the temperature is not to be assigned to the word sequence "I am cold", but rather a raising of the temperature.

Therefore the dialogue manager 30 or the classifying device 40 will save or store in the memory 70 the word sequence "I am cold" together with the semantic annotation (temperature-setting (temperature="high")).

Storing is undertaken in this case only if an utterance that has partly been recognised correctly is present, a temporal and semantic proximity is present, or only a temporal proximity is present. An utterance that has partly been recognised correctly is the meaning/word-pair temperature-setting/"cold". A temporal and semantic proximity is present if after the reducing of the temperature by the dialogue system the user intervenes within a defined period of time and turns up the temperature himself/herself or performs a further speech/text input. The user accordingly remains in the region of the temperature setting (semantic proximity) and intervenes within a defined period of time, for example by actuating suitable controllers in the motor vehicle (temporal proximity). A purely temporal proximity means that the user intervenes within a defined period of time or himself/herself performs a setting that has nothing to do with the one recognised (semantically remote).

The fact that the aforementioned utterance "I am cold" was partly recognised correctly can be established by the dialogue system from the fact that in response to the enquiring of the dialogue system the user replies appropriately or intervenes or operates the setting option displayed. In the above example the dialogue system has at least recognised correctly that it is to be a question of a temperature setting.

Storing is undertaken in the case of temporal and semantic proximity if the user reacts within a certain (short) period of time (e.g. 0-5 sec or 0-1.5 sec) to the enquiring of the dialogue system or to the input possibility made available. If the user reacts, for example, only after a longer period of time (>8 sec), it is not ensured that the action of the user is still connected with the utterance "I am cold". Accordingly, no storage of the aforementioned data is undertaken.

But storing may also be undertaken in the case of only a temporal proximity between interaction of the dialogue system and the user. If the user changes, for example, from the temperature setting displayed (by the dialogue system) to the setting of the air-conditioning system, in order to switch the latter off, or operates the window-lifter in order to close the windows, this can likewise be stored in connection with "I am cold". If this reaction of the user occurs within a certain short period of time after the interaction of the dialogue system, the dialogue system proceeds on the assumption that a certain temporal proximity is present. In this case the utterance "I am cold" will also be stored together with the semantic annotation (window-lifter (windows="close")) or (air-conditioning-system-setting (air conditioning system="off")). As is evident from this example, the semantic proximity of the sense content recognised first, namely the setting of the temperature, is not fulfilled, but rather exclusively the temporal proximity.

The speech-input signals—or, to be more exact, words or word sequences saved in the memory 70 together with semantic annotations—are processed by the training unit 80. This processing can be undertaken periodically or after the storing of a certain number of new meaning/word(-sequence) pairs (data pairs).

The training unit 80 may in this case be part of the dialogue system. But it may likewise be an autarkic system and may have been implemented at a decentralised location, such as, for example, on a server (not shown) of a service-provider. In the latter case, the dialogue system is capable of communicating the data saved in the memory 70 to the training unit of a server by means of a communications unit 90.

The training unit 80 now accepts the data stored in the memory 70 into the semantic model 60. If semantic annotations together with word sequences have already been stored in the memory 70, these can be taken over directly into the semantic model 60. Otherwise the training unit 80 has been set up to process the data saved in the memory 70—such as, for example, speech-input signal, word sequence, interaction of the dialogue system, period of time up until the reaction of the user, user reaction etc.—in order to generate corresponding data for the semantic model 60. For example, existing probability values in the semantic model 60 can be adapted, or new meanings, as well as new words or word sequences with associated probabilities, can be accepted.

Alternatively, the processor 20, the dialogue manager 30 and/or the classifying device 40 can save all the data in the memory 70 and provide them with a time-stamp. In the case of these saved data it may then be a question of the received speech signals, received word sequence, output dialogue of the dialogue manager, recognised semantic classification etc. The training unit 80 is then capable of ascertaining, on the basis of the time-stamp, whether the stored data are being discarded (insufficient temporal or semantic proximity) or whether the data are being entered into the semantic model.

If the training unit has been set up on a remote computer system (server), it is capable of processing the data of a plurality of dialogue systems. After the training of a common semantic model on the server, an updated semantic model can be communicated to the dialogue system via the communications unit 90. Hence the semantic model 60 of the dialogue system can be updated periodically and can accept the utterances and interactions of various users. This has the advantage that a plurality of dialogue systems can be rapidly trained and adapted to various utterances.

For the purpose of clarification, yet further examples of the present disclosure will be shown. A user can communicate to the dialogue system the utterance "Please call my father". From the word "call", the dialogue system is capable of ascertaining the sense content of the word sequence at least partly, namely that the telephone is to be utilised. Via the dialogue manager 30 and the output unit 320 the system can enquire "Whom shall I call?" or can display the address book or telephone book of the system. From the next reaction of the user—such as, for example, from the utterance "Peter Müller" or from the selecting of this name on a display screen by means of keyboard 240 or touchscreen 250—the system "learns" that "Please call my father" is synonymous with (call (name="Peter Müller").

In a further example the user utters the expression "it is raining". As a reaction thereto, the dialogue system may possibly recognise that by "raining" the windscreen wipers are meant. After the windscreen wipers have been switched on, or after the enquiring as to whether the windscreen wipers are to be switched on, the dialogue system registers that the user closes the windows within a short time. Therefore the dialogue system can learn that by "it is raining" both the switching-on of the windscreen wipers and the closing of the windows are meant. Further semantic meanings, for example for a navigation instrument, are "please enlarge the map" for zoom in; "higher resolution please" for zoom in; "make the map smaller please" for zoom out; "lower resolution" for zoom out, etc.

As a result, the semantic model develops a data structure that is ever more extensive and that contains the respective probability that a certain meaning has been assigned to a word or that a certain meaning has been assigned to a certain word sequence.

Figure 4:
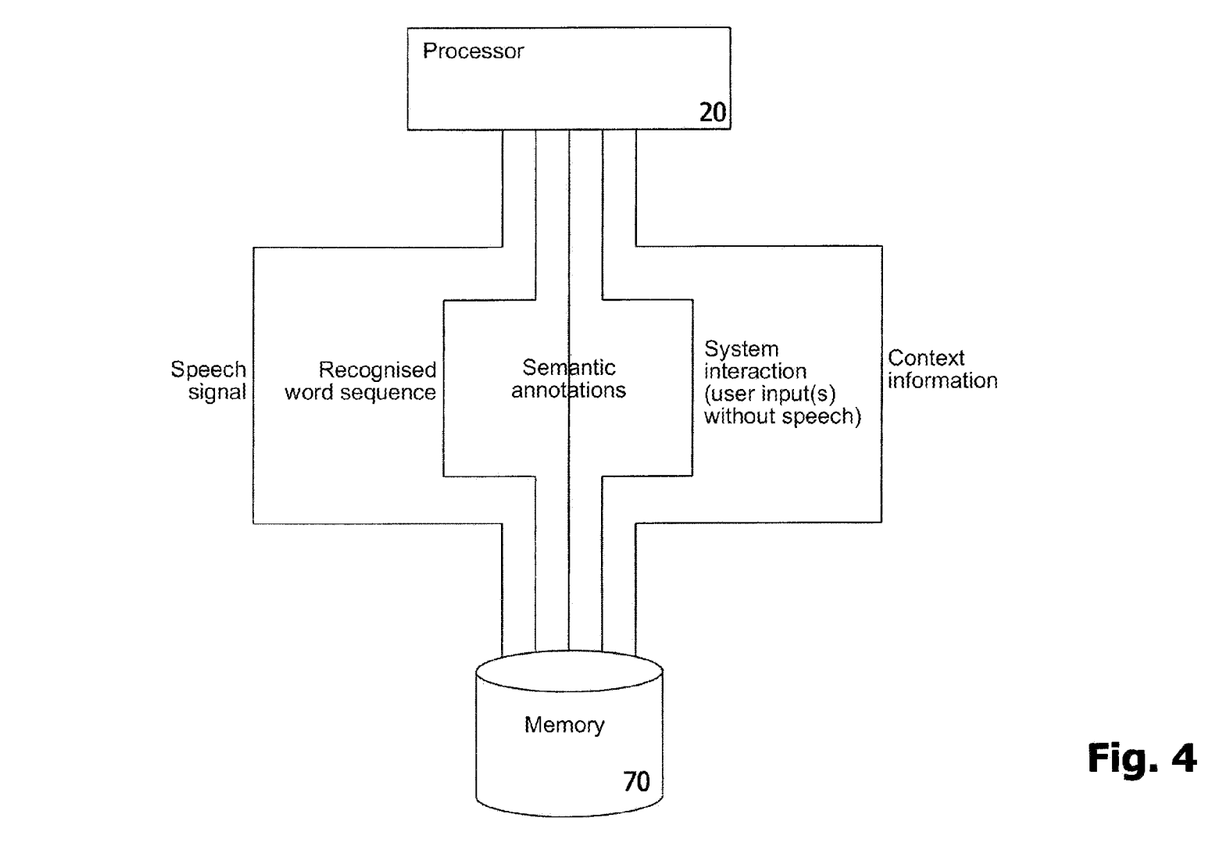
FIG. 4 shows a block diagram of the flow of data within a dialogue system.

With reference to FIG. 4, the various data that are communicated between the processor 20 and the memory 70 are shown. These may be, on the one hand, the speech signal as received by the input unit 220 (FIG. 2). Similarly, in this connection it may be a question of a text-input signal if the input was effected not by means of speech but rather via a keyboard 240. Moreover, the recognised word sequence can be transmitted from the processor 20 to the memory 70 for storage. In this case it is a question of the word sequence of the received speech signal that was recognised by the recognition unit 210 (FIG. 2), or of a text input effected via the keyboard 240. Furthermore, the semantic annotation as ascertained by the classifying device 40 is transmitted to the memory 70. In addition, the further item of user information received via the input interface 12 can be transmitted to the memory 70. In this case it is a question of interactions of the user with the system and similar, which are received via the input unit 220. For example, these are further inputs via the keyboard 240, the keypad 245 or the touchscreen 250 (all FIG. 2). Finally, context information can also be communicated from the processor 20 to the memory 70. Included in this are further data of the system, such as, for example, sensor signals (rain sensor, light sensor, etc.) or other states of the system (speed, current position, etc.).

These data are either communicated to the memory directly in context or stored together with a time-stamp in each instance. For example, a recognised word sequence, a classified semantic annotation and a further reaction of the user can be stored individually and in each instance with time-stamp. In each case the data are saved in the memory 70 in such a way that the training unit 80 can train the semantic model on the basis of the new sense content of a word sequence, the word sequence and/or a transcription into a semantic annotation.

Figure 5:
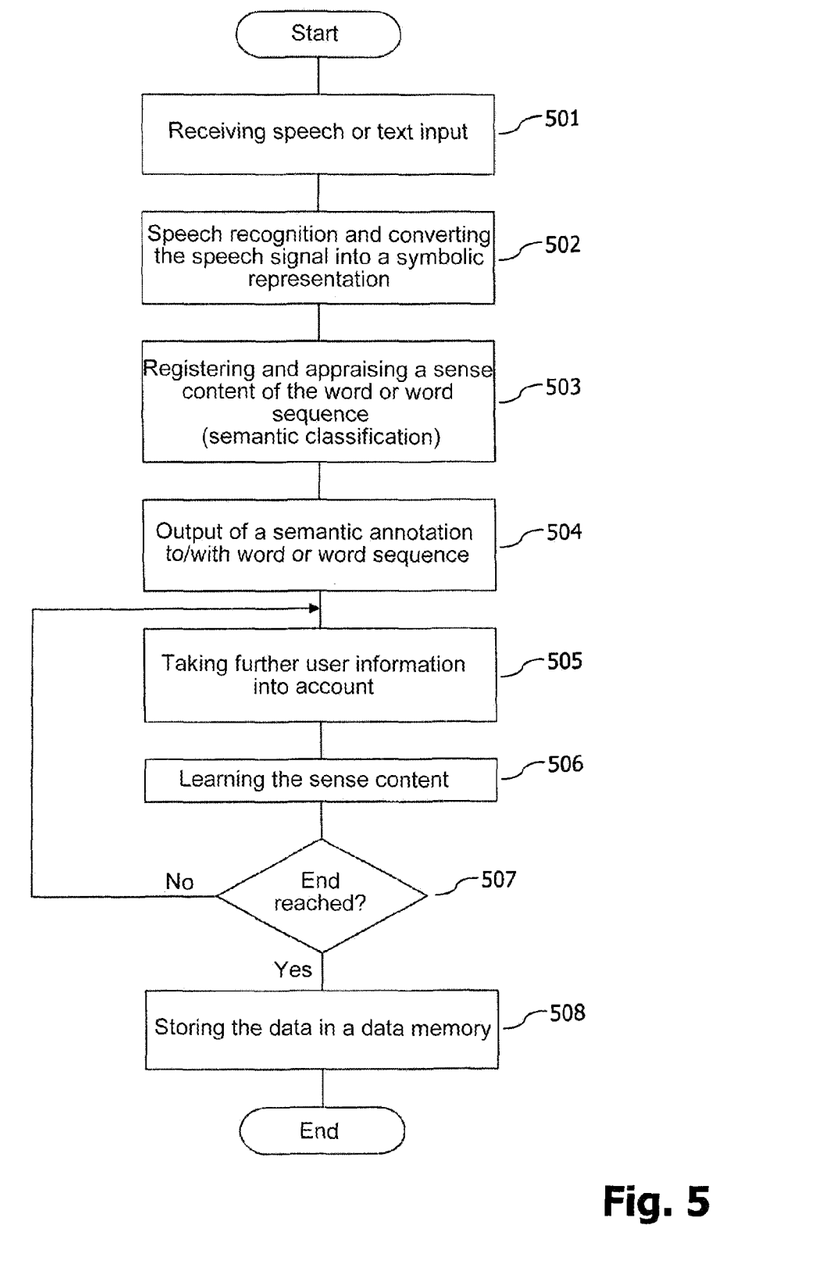
FIG. 5 represents a flow chart of an embodiment of a method for automatic training of a dialogue system.

FIG. 5 shows a flow chart of a method according to the present disclosure. In a first step 501 a speech input of the user is received. Similarly, a text input may also be received.

In the next, optional step 502 a speech recognition takes place, in order to analyse the received speech signal and to recognise a word or word sequence. This recognised word or recognised word sequence or the text input is subsequently output, for example as a symbolic representation.

In a step 503 the dialogue system registers and appraises a sense content of the word sequence, by the word sequence being classified on the basis of a trainable semantic model. As described above, in this process a semantic annotation for the word or word sequence is made available.

In a step 504 the semantic annotation is output together with the word or word sequence.

If a further item of user information ensues or is necessary, in a step 505 this further item of user information is taken into account. The taking of the item of user information into account may include deriving the item of user information from a user input that immediately follows the receiving of the word sequence (step 501). Of course, the user input may also be undertaken after a query by the dialogue manager or the performing of a setting by the system. As described above, it may be a question of a correcting control input which corrects a preceding control command made available on the basis of the word sequence. But it may also be a question of the receiving of one or more user inputs in reaction to making a restricted choice of input options available.

In a step 506 the sense content of the word sequence is learned on the basis of the additional item of user information. The learning is undertaken only when a connection between the word sequence and the user information can also be established. This connection is determined on the basis of a temporal and/or semantic correlation, as elucidated above. In the case of the learning, it may also be a question of at least one of establishing the sense content of the user information, comparing the received word sequence with the sense content of the user information, and successively deriving or completing the sense content of the received word sequence on the basis of a known sense content of the user information.

In a step 507 it is ascertained whether an end of the learning of the sense content has been reached. In other words, further user information is taken into account and learned until such time as the sense content of the received word sequence is recognised completely and/or as trustworthy and/or is terminated by a user abort. The sense content is regarded as trustworthy if a confidence value, i.e. a probability for the meaning/word pair, is ascertained that lies above a predetermined threshold value. The probability can be established by reason of the temporal and/or semantic proximity. If an end has not been reached, the procedure goes back to step 505, otherwise it continues with step 508.

Thus, steps 505 and 506 can be iteratively repeated until a termination condition as discussed above in conjunction with step 507 is satisfied. That is, the learning of the sense content of a speech input (for instance, the completing of incompletely classified received speech inputs, the correcting of misinterpreted parts of received speech inputs or the reclassifying of incorrectly classified or non-classified speech inputs) is iteratively repeated by (gradually) taking into account the received user information.

In step 508 all the information that has arisen in connection with the speech input is stored in the data memory 70. In this information there may be included the word sequence supplied by the recognition unit 210, the user information, the learned sense content and also the confidence value.

If enough data have been collected, a semantic model is trained on the basis of the stored data—that is to say, the received word sequence, the learned sense content of the word sequence and/or a corresponding transcription into a semantic annotation. Thus, by an incompletely classified word sequence being completed, by a misinterpreted part of the received word sequence being corrected, and/or by an incorrectly classified or non-classified word sequence being reclassified, the training data are extended. For the purpose of training the semantic model, previously unknown data are now available, from which further meaning/word pairs can be learned or existing pairs can be improved. Consequently the semantic model as a whole is improved.

One advantage of the technique described herein is that the semantic model of a dialogue system can in same implementations be automatically trained or adapted without requiring any conscious cooperation of the user. That is, the taught training method does not require any special or separate user inputs for semantic model training purposes, but uses any suitable user information that is received in connection with a control input for the machine. User information is classified as suitable information when some correlation (a temporal and/or semantic correlation) between the information and a speech input can be established.

The embodiments and examples described above relate to a vehicle control system. The disclosed system and method can self-evidently also be applied in other interactive systems. Numbered amongst such systems are search engines, chatbots, games consoles, web-mining applications and also other interactive services. These systems and services enable an input by a user, for example via a hardware user interface or graphical user interface (GUI). The input and additional user information as a result of further interactions can be received by the classifying device, and the sense content can be registered with the aid of a semantic model, as elucidated above.

The invention claimed is:

1. A computer-implemented method for automatic training of a dialogue system, in order to generate semantic annotations automatically on the basis of a received speech input, the method comprising the following steps:
   receiving, by the dialogue system, at least one speech input in the course of an interaction with a user;
   generating, by the dialogue system, a symbolic representation from the speech input by performing recognition on the received speech input;
   registering and appraising, by the dialogue system, a sense content of the symbolic representation of the received speech input, by the symbolic representation being classified on the basis of a trainable semantic model, in order to make a semantic annotation available automatically for the received speech input;
   controlling, by the dialogue system, a vehicle component based on the semantic annotation;
   receiving, by the dialogue system, additional user information representing a function selection of a vehicle component by the user;
   automatic learning of the sense content of the received speech input, by the dialogue system, on the basis of the additional user information, if a connection between the reception of the speech input and the additional user information is determined on the basis of a temporal and semantic correlation, or semantic correlation,
   repeating iteratively, by the dialogue system, the receiving of additional user information and automatic learning of the sense content of the received speech input until a termination condition is satisfied.

2. The method according to claim 1, further including:
   training the semantic model on the basis of at least one of the received speech input, the learned sense content of the received speech input and a corresponding transcription into a semantic annotation.

3. The method according to claim 1, wherein the learning step includes at least one of the following steps:
   establishing the sense content of the additional user information;
   comparing the received speech input with the sense content of the additional user information; and
   successively deriving or completing the sense content of the received speech input on the basis of a known sense content of the additional user information.

4. The method according to claim 1, wherein the learning includes at least one of the following procedures:
   completing an incompletely classified received speech input;
   correcting a misinterpreted part of the received speech input; and
   reclassifying an incorrectly classified or non-classified received speech input.

5. The method according to claim 1, wherein the receiving the additional user information includes deriving the additional user information from at least one user input that immediately follows the reception of the speech input.

6. The method according to claim 5, wherein the at least one user input includes at least one correcting control input which corrects a preceding control command made available on the basis of the speech input.

7. The method according to claim 5, wherein the user inputs are based on acoustic or haptic actions of the user.

8. A non-transitory computer readable medium storing a program causing a computer to execute the method according to at least one of the preceding claims.

9. An adaptive dialogue system for use in a vehicle, which has been designed to generate semantic annotations automatically on the basis of received speech inputs, comprising a processor executing a program to function as:
   an input interlace which is designed to receive at least one speech input in the course of an interaction with a user;
   recognition device which is designed to generate a symbolic representation from the speech input by performing recognition on the received speech input; and
   a semantic classifying device which is designed to register and classify the sense content of the symbolic representation of the received speech input on the basis of a trainable semantic model, to make a semantic annotation available automatically for the received speech input on the basis of the classification,
   an output interface which is designed to output a signal based on the semantic annotation to a vehicle component in order to control the vehicle component, wherein the input interface is further designed to receive additional user information representing a function selection of a vehicle component by the user,
   to automatically learn the sense content of the received speech input on the basis of the additional user information, if a connection between the reception of the speech input and the additional user information is determined on the basis of a temporal and semantic correlation or a semantic correlation, and
   to repeat iteratively receiving of additional user information and automatic learning of the sense content of the received speech input until a termination condition is satisfied.

10. The adaptive dialogue system according to claim 9, further including a training device which is provided to train the semantic model on the basis of at least one of the learned sense content of a received speech input, the received speech input, and a transcription into a semantic annotation.

11. The adaptive dialogue system according to claim 9, further including a storage device which is provided to store, entirely or partly, at least one of the received speech input, the learned sense content of the received speech input and a transcription into a semantic annotation.

12. The adaptive dialogue system according to claim 9, wherein the semantic model has been designed in the form of a neural network or a decision tree.

13. The adaptive dialogue system according to claim 9, further including a communications device which is provided to send to a server or to retrieve from a server the received speech input together with at least one of the learned sense content of the received speech input and with the transcription.

14. The adaptive dialogue system according to claim 9, wherein the adaptive dialogue system is part of a human/machine interface.

15. A control device for a vehicle, including the dialogue system according to claim 9.

* * * * *